United States Patent [19]

Kraft

[11] Patent Number: 4,978,305

[45] Date of Patent: Dec. 18, 1990

[54] FREE RESPONSE TEST GRADING METHOD

[75] Inventor: William D. Kraft, Middlesex County, N.J.

[73] Assignee: Educational Testing Service, Princeton, N.J.

[21] Appl. No.: 362,262

[22] Filed: Jun. 6, 1989

[51] Int. Cl.⁵ .............................................. G09B 7/00
[52] U.S. Cl. .................................... 434/353; 434/358; 235/454; 235/462; 235/472; 382/59
[58] Field of Search .................. 434/353, 359, 358; 235/435, 454–456, 462–466, 472; 382/58, 59

[56] References Cited

U.S. PATENT DOCUMENTS

| | | | |
|---|---|---|---|
| 3,187,445 | 6/1965 | Haritonoff | 434/359 |
| 3,203,116 | 8/1965 | Shaw et al. | 434/359 X |
| 3,209,471 | 10/1965 | Brittan | 434/359 |
| 4,088,981 | 5/1978 | Gott | 382/59 |
| 4,478,584 | 10/1984 | Kaney | |
| 4,541,806 | 9/1985 | Zimmerman et al. | |
| 4,705,479 | 11/1987 | Maron | |
| 4,721,849 | 1/1988 | Davis et al. | |
| 4,760,246 | 7/1988 | Shepard | |
| 4,781,596 | 11/1988 | Weinblatt | |
| 4,804,949 | 2/1989 | Faulkerson | 235/472 X |

OTHER PUBLICATIONS

Videx, Inc., "Using the Timewand–Document Control, Inventory Control, Time Billing, Time Cards", Aug. 1986.

Videx, Inc., "Time Wand Application Examples", Aug. 1986.

Primary Examiner—Richard J. Apley
Assistant Examiner—Jennifer L. Doyle
Attorney, Agent, or Firm—Michael I. Chakansky

[57] ABSTRACT

A method and system for grading free response tests including the use of highly accurate machine-readable data codes to uniquely associate test-taker, test and reader/grader, and a portable sensing device which stores codes read by the device for subsequent entry into a host computer. The method permits multiple readers/graders to evaluate the same test without one reader/grader influencing another, while reducing paper handling and key entry of data inherent in large volume paper and pencil testing techniques.

20 Claims, 6 Drawing Sheets

1989 AP BIOLOGY
Folder Control Sheet

TO GRADE EACH FOLDER...

First: Wand your Reader Number on your Essay Scoring Card.

Second: Wand the BIOLOGY Test Code:

Biology - Test Code 20

Write: FOLDER NUMBER

Third: Wand Question Number you are grading:

| Question Number | | | |
|---|---|---|---|
| 1 |  | 1 |
| 2 |  | 2 |
| 3 |  | 3 |
| 4 |  | 4 |

Write: QUANTITY

Fourth: Wand this Folder's Number:

Place Folder Number Label here

Fifth: Wand the combination of each Essay's AP Number and Score together.
THINK: "AP - SCORE"

SIXTH: Cross out a box to indicate Question graded.

QUESTION GRADED

| 1 |
| 2 |
| 3 |
| 4 |

While working on this Sheet, if you are unsure you entered a bar code properly or if a blinking light indicates an out-of-sequence entry, just start over by wanding Reader Number again.
To change an entry while scoring an Essay, merely wand the AP Number and Grade over again.

Copyright © 1989 Educational Testing Service.

AP QUALITY CONTROL SHEET

Test Code __20__    Folder Number _______    Question Number _______
       Biology Table Leader _______________________    Table Number _______

Reader's Name _______________________    Reader Number _______

| AP Number | Reader's Grade | Table Leader's Grade | Revised Grade: | | Dbase Check |
| | | | New Grade | TL's Initials | |
|---|---|---|---|---|---|
| | | | | | |
| | | | | | |
| | | | | | |
| | | | | | |
| | | | | | |
| | | | | | |
| | | | | | |
| | | | | | |
| | | | | | |
| | | | | | |

Copyright © 1989 Educational Testing Service.    
                                                                         Date & time of Dbase check

FIG. 6

1989 AP Biology Reader Reassignment Form

If Readers change Table assignments, a Reassignment Form must be completed for each reassigned Reader and sent to the Biology Computer Room along with a WandSweep of all Wands from the Reader's original Table, performed at that same time.

- The following Reader:

Reader's Name  ______________________________

Reader Number  ______________

- Has been reassigned from this Table:

Table Leader's Name  ______________________________

Table Number  ______________

- To this Table:

New Table Leader's Name  ______________________________

New Table Number  ______________

New Question Number  ______________

- As of this Date and Time:  ______________________________

______________________________
Original TL's signature

Copyright © 1989 Educational Testing Service

Date/time Reader database revised:
______________

FIG. 7

1989 - AP BIOLOGY
TimeWand Quality Control

_________________
Wand Number

_________________
Date and Time

_________________
Aide

1. Light should BLINK.    `* T 2 0 *`

2-12. Light should be STEADY.
`* R Q C 0 *`
`* T 2 0 *`
`* Q 1 *`
`* Q 2 *`
`* Q 3 *`
`* Q 4 *`
`* F Q C 0 0 0 *`
`* E Q C 1 2 3 4 5 *`
`* G 1 0 *`
`* E Q C 6 7 8 9 0 *`
`* G 0 5 *`

Procedures for Wand QC:

1. Each 30 minutes, select a TimeWand from the "Fresh" supply.
2. Wand (scan) the 12 bar codes in the sequence they appear on this sheet, making sure you get a BLINKING light on number 1, and a STEADY light on each of numbers 2-12. There should be NO beep.
3. If the Wand performs OK, return the Wand to the DownLoad Aide, to be downloaded in the next "Sweep" download. If it doesn't, label it a QC PROBLEM WAND and notify Bill Kraft or Jason Jones.
4. A report will print out (expected within 30 minutes) that lists the 2-12 bar codes you scanned. Compare that report to be sure that every character printed in the "Bar Code" column on the report agrees completely with the eye-readable portions of the 2-12 bar codes on this form (ignore asterisks).
5. If the two agree, signify by initialling the Wand Listing Report and file this page together with the Wand Listing for this QC'd Wand.
6. If the two DISAGREE, IMMEDIATELY repeat steps 2-5, using a different TimeWand Quality Control document. If they again disagree, notify Bill Kraft or Jason Jones.
7. At the end of the reading, organize the files of reports and QC forms by date and time and deliver them to Bill Kraft in the AP Biology Computer Room (or in D-753).

Copyright © 1989 Educational Testing Service.

FIG. 8

FREE RESPONSE TEST GRADING METHOD

A portion of the disclosure of this patent document contains material which is subject to copyright protection. The copyright owner has no objection to the facsimile reproduction by anyone of the patent disclosure, as it appears in the Patent and Trademark Office public patent files or records, but otherwise reserves all copyright rights whatsoever.

BACKGROUND OF THE INVENTION

1. Field of the Invention

A method for grading free response tests which is easy to use, operates at very high levels of accuracy, is cost-effective, reliable, easy to teach to temporary readers/graders, and permits each reader/grader to act independently of any fixed facilities during the grading process. The key operational elements in the method comprise the use of highly accurate machine readable data codes to uniquely associate test-taker, test and reader/grader, and a portable sensing device having a memory for storing codes read by the device for subsequent entry into a host computer. The method permits multiple readers/graders to evaluate the same test without one reader/grader influencing another, while reducing paper handling and key entry of data inherent in large volume paper and pencil testing techniques.

2. Description of the Prior Art

The task of properly administering the taking of tests by large groups of test-takers in the United States presents many logistical and procedural problems. With respect to free response examinations alone, several times a year, hundreds of thousands of students are tested, requiring, on a temporary basis: locating, hiring, training and supervising large numbers of clerical and grading personnel; obtaining suitable temporary test sites and preparing the test site for testing and grading requirements; distributing and collecting massive quantities of testing and grading materials; insuring proper identification and association of examinee, test, grade and grade report; analysis of the grades for particular questions so as to insure the grading is proper; and reporting the grade to the examinee and/or others within a limited amount of time.

By way of example, Educational Testing Service ("ETS"), the inventor's assignee, administers the taking, grading and reporting of essay examinations taken each Spring by approximately 450,000 students in order to qualify for college credit based on high school advanced placement work. In administering these examinations, ETS hires and trains hundreds of clerical aides and readers/graders, obtains suitable test sites across the country and installs large quantities of equipment at these test sites. Additionally, ETS must move and keep track of literally millions of pieces of paper, before, during and after the examination.

Importantly, effective grading requires that the reader/grader be allowed to perform his/her reading/grading with minimal distraction, either from clerical duties related to grading or from prior grading of the test. It is important that the grading be objective, that an essay containing one or more questions and/or graded by more than one reader is graded in a manner that prevents a subsequent reader from knowing the grade(s) awarded this essay by prior readers and consciously or unconsciously being influenced by the prior grade—a phenomenon known as the "halo effect".

Prior art methods generally attempted to insure such objectivity by providing methods of concealment of the previous grader's written scores; for example, the use of "band-aid" like shields, grade encoding and the use of "invisible ink". However, these methods added to the complexity and labor-intensive nature of the testing process and thereby caused new and/or additional problems and increased process costs. Importantly, any increase for the grader in the complexity of the grading process will generally have a negative impact on the grader's efficiency and objectivity.

Kaney, U.S. Pat. No. 4,478,584, discloses a method for maintaining the independence of ratings by multiple evaluators using an attached multicomponent rating shield, where one component of the shield is removed by the reader/grader to mask the grade, another component is removed in order to unmask the grade and the remaining component has the ability to permit the grade to be machine scanned through it.

Another method uses "band-aid" like paper strips which are pasted over each score written on an essay's grading sheet before it is distributed to each subsequent reader. After an essay has been completely scored, all the paper strips are cut away to reveal the scores for key entry operators. Though this process has been used for many years, it requires that each grade but the last be concealed clerically, thereby introducing an additional process step with respect to every score but the last on each essay.

A representative ETS advanced placement test, the Biology examination, is presently administered to about 35,000 test-takers during the Spring. A single Biology essay may contain 4 questions. Employing the "band-aid" technique to cover the grades for the first 3 questions requires 105,000 paper strips and the clerical manpower to apply them. In the largest essay-based program currently administered by ETS, approximately 1,500,000 (1.5 million) paper "band-aids" are applied and removed in this manner during a few weeks in June each year. While the "band-aid" procedure addresses the problem of grader independence when properly used, it adds a process step and increases the cost and time involved in completing the examination process.

In order to insure independence without the need to cover the scores, grade encoding is sometimes employed. In one common embodiment of this method, each table (working unit) of readers/graders is assigned a different set of alphabetic codes to substitute for the range of numeric scores to be awarded. For readers/graders at a table a score of 4 might be encoded as "R", for other readers/graders working at another, as "B". These encoded scores are subsequently computer processed and reconverted to numerics using a conversion table containing each reader's identification number, the range of encoded scores and their numeric equivalents. This method increases the complexity of the grading process for each question for the administrators and the readers/graders and introduces the potential for error. Moreover, even though the grades are executed, and the readers/grades are instructed to maintain the confidentiality of the codes, there is nothing to actually prevent disclosure, for example, during conversations among readers, and defeat the independence of the reading/grading process.

Another method of concealment is the use of ultraviolet light-sensitive "invisible" ink to write the scores. The "invisible" scores are revealed later to data entry operators by illuminating the documents with ultra-violet lamps. This method has raised questions not only as to its safety, but also as to whether the "invisible" scores are really invisible. It appears that the "invisible ink" employed in the readers'/graders' felt-tip pens can be faintly discerned in certain light conditions. In any case, as with the "band-aid" and grade encoding methods, this method also employs the clerically-intensive methodology of key data entry and grading sheets.

While it has been suggested that optical scanners could be used to collect student grades after the grades have been set, the suggestions are directed to the mere entry of raw data and not to obtaining a better quality of grade. The process of the present invention enhances the grade quality by using, in part, the sensing device to eliminate the influence of a prior reading/grading on a subsequent reading/grading.

The inherent centralization of document scanning and/or key entry sites in the prior art methods requires the organization and transportation of source documents to and from reading sites. This requirement increases costs while introducing frustration and delay at critical points in the process for both the grading staff and data entry personnel. One additional expense arises out of the requirement that each essay answer book must also be designed and printed with an essay answer grading sheet as an appendage to its back. The requirement is necessary in order to reduce the potential for error as well as the amount of clerical work associated with keeping two separate documents involving one test-taker together through an extensive hand grading process. Another additional expense and a particular obstacle to the establishment of multiple remote reading sites is the quality control accountability requirement that these grading sheets, which are transported to a central data entry location for key entry of data, undergo counting and batching operations at the central location.

The time required by the data entry operations also increases the delay in providing management information to administrative personnel at the reading sites. Information, such as how long it is taking readers/graders to grade a particular question and how consistent the readers/graders are in grading a particular question, is needed to measure the progress of the reading in order to make any necessary adjustment in resources. For example, if the grading of one question is taking longer than another question, the number of readers/graders assigned to grade each question can be adjusted so that the entire grading procedure is completed within the time limitations and before the readers/graders are scheduled to depart. Generally, management information is contained in the documents in transit and typically only becomes available in summary form the following morning. Elaborate predictive measures are utilized to gain an understanding of progress, but there remains a need for factual, current information during the reading in time to influence the reading itself.

Many essay testing programs have instituted a requirement that each question must be read twice and those two scores are compared to assure that if they differ, the difference is within a predefined range. Scores that differ by too broad a range are graded again to resolve the "score discrepancy". There are special processing problems inherent in this requirement, most relating to speed of the identification of the discrepancies. Discrepancies should be identified as soon as possible, so that any necessary third grading may be performed while the temporary reading site is still in operation and the temporary staff of high school teachers and college professors hired for the reading task is still available.

To identify discrepancies utilizing a method which relies on grading sheets separate from the essays for the collection of scores means that a discrepant grading sheet used to identify the discrepancy may be available, but the original essay may not and so cannot be immediately regraded. Most methods provide no way to locate individual essays within the thousands moving through the pipeline until the reading is completed and a clerical essay sort can be performed, providing a basis for retrieval.

One recently developed procedure to address this problem employs several key-entry personnel and on-site personal computers to more quickly identify discrepancies. This procedure requires the additional process step of keying each essay's reader identification numbers and respective encoded scores into a digital computer programmed to perform score decoding and to compare the two resulting scores. This process also provides somewhat more timely management information by generating summaries of the essays so processed. However, because the representative data which is key entered on-site is not the actual data used in score reporting, the discrepancy identification process is not conclusive. The handwritten data which is key entered on site is not the actual data which is encoded as machine readable pencil-darkened ovals on the grading sheet and is used in the eventual grade report. Therefore, these two versions of a reader's score can differ, creating another rejection and requiring additional clerical resolution and possible regrading of the question.

Many low volume testing programs have concluded it is simply easier to conduct a make-up reading a week or two later, in which all the discrepancies are resolved. Of course, this adds to the expense of the process and introduces weeks of delay into the reporting of scores to test-takers. The ideal situation would provide for rapid identification of all discrepancies while readers were still available and would utilize real data with immediate location of the discrepant essay.

There is an ongoing need for the leader (table leader) of reading groups to monitor each participant's consistency of adherence to predefined scoring standards. However, it is difficult to establish methods for collecting data on the consistency and reading rate of individual readers through paper and pencil techniques. When such information is collected it is typically via special studies based on timed observations of the reading, employing sampling techniques. Prior to the present invention, there have been no techniques available which conveniently provide more equitable information by routinely collecting performance information on every reader's score.

Additionally, paper and pencil techniques rely on the physical movement and control of grading sheets, requiring the creation of ancillary documents such as transmittal forms, control forms, paper "band-aids", work orders, etc. Each of these documents must be batched, moved, counted, controlled, and filed, requiring staffed mini-systems to assure their proper handling and thus increasing project overhead.

However, there has been a growing shortage of qualified personnel available to work on the kinds of part-time assignments typified by essay readings. ETS' largest essay grading program currently requires the hiring of approximately 325 such personnel for several weeks in June each year and it is becoming increasingly difficult to locate them. This program has been growing at a steady rate and the need for clerical aides will continue to grow in a parallel fashion if clerically-intensive paper-based methods are unchanged.

Any solution proposed for the problems associated with free response grading must offer ease of use, objectivity, very high levels of accuracy and consistency, affordability for large and small programs alike, reliability, and cost-effectiveness. Additionally, the "solution" should not increase score reporting turnaround time, the number of steps required to process the test, or the workload and training time for readers/graders. In the past, these requirements have created serious obstacles because of the cost and complexity of the numerous individual method components generally required by the solution.

Other methods have not been effective in operating in temporary situations, where important considerations include site location, equipment portability, ease of setup and takedown (minimal cabling), telecommunications, and equipment security.

SUMMARY OF THE INVENTION

The object of the present invention is to resolve many of the problems encountered in traditional prior art methods for the reading/grading of essays and other free response tests.

It is an object of the present invention to reduce or eliminate the effect of one reader's/grader's score on a subsequent reader/grader, while reducing or eliminating the non-grading aspect of the process for readers/graders, and permitting the reading to take place at temporary locations.

It is a further object of the present invention to reduce or eliminate data entry errors and delays.

It is a further object of the present invention to permit quicker identification and resolution of score discrepancies and a timely and more complete evaluation of reader/grader performance.

It is still a further object of the present invention to reduce the paper handling associated with large free response examinations.

It is still a further object of the present invention to reduce the number of clerical staff required to support large free response examinations through the reduction in paper handling and key entry of data.

It is still a further objective of the present invention to raise the quality and efficiency of the reading/grading process and reduce the number of readers/graders required to grade a certain number of questions, by allowing the reader/grader to spend a larger portion of his/her time and attention to actually reading and grading and not clerical activities.

Accordingly, at the time of registration for the test, a randomly assigned machine-readable data code is associated with each test-taker, either via labels to be affixed to each test document or through matched sets of test documents already bearing such data codes. In the former case, the test-taker must affix the data coded label to his/her test. The association between a test-taker and the test-taker's data code is retrievably stored on a central computer database.

In preparation for the grading process, a data coded reader number identification label is printed and affixed to an essay scoring card bearing data coded grade scores and distributed to each reader. This card now contains data codes sufficient to identify the individual reader and the range of grades appropriate to the reader's grading task. The association between a reader and the reader's number is retrievably stored on a central computer reader database. Essays are placed in folders, each identified by a bar coded folder control sheet presenting bar coded information on the specific test, the potential question numbers to be graded and the number of the folder itself.

To perform the grading task, each reader is presented with a portable sensing device having a reading or scanning means for reading data codes and storage means for storing data codes read by the device. Since the stored data will subsequently be entered into a host computer, this device is also used as a data entry device for the method.

Then the reader initializes his/her sensing device by scanning his/her data coded reader number and the data coded essay information on the folder control sheet, both personalizing the sensing device and associating it with the specific grading task ahead. Next, the first test is read, a grade determined, the test-taker's data coded identification number on the face of the first testbook is scanned, and the selected grade data code is scanned from the reader's essay scoring card.

At this point, all the data necessary for this question (as well as the date and time each bar code was scanned) have been read and stored and the next testbook can be processed in the same manner; first the identification number, then the score. These two steps are repeated until the entire folder of essays has been read and another folder can be graded in the same manner, starting again with reader number.

Periodically throughout the day, the readers' "used" sensing devices are exchanged for "fresh" devices. The "used" sensing devices are inserted into the slot of a recharging-downloading device, which loads the data into a personal computer where accuracy validation checks are performed before adding it to the data base of scores and information on the progress of the reading. Personal computers may also function as the file server and run a data base management system so as to maintain the central scores database and perform reporting functions. Score discrepancies can be immediately identified. After the data is successfully downloaded, the sensing device is cleared. At this time the computer downloads the appropriate directing program to the sensing device, for example, instructions to signal a successful bar code scan with a light change and not a noise. The sensing device is now ready for its reuse as a "fresh" sensing device.

In one embodiment of the present invention, a data base management system and a modem provide the ability to upload data to a central mainframe computer system for score reporting and to allow local pooling of data on personal computers for on-site reporting on the progress of the reading. These local reports include informational summaries for table leaders and chief readers, item performance statistics, and management information on readers' activity. In another embodiment, the on-site computers also provide the function of score reporting.

DESCRIPTION OF THE PREFERRED EMBODIMENTS

The present invention can accommodate several procedural designs in providing necessary data coded test materials to examinees. For example, the data codes can be bar codes, and these bar codes may initially appear on the test materials and/or they can initially appear on labels for distribution to the test-taker for subsequent affixing to the test materials. If the label procedure is utilized, the labels can be distributed to the examinee either during registration or at the test site.

Figure 1:
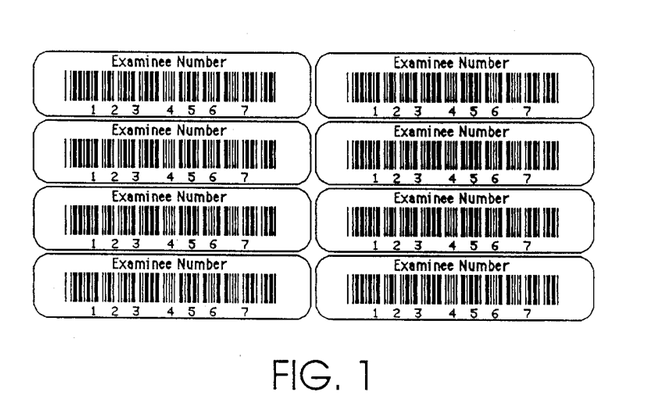
FIG. 1 is an illustration of several examinee adhesive labels of the present invention.

According to a preferred embodiment, when a prospective test-taker registers with ETS to take the examination, he or she receives a "Candidate Pack" containing detailed instructions with pertinent forms and codes. Bound in the center of this booklet is a set of adhesive examinee labels 1, each containing a bar coded examinee number. The examinees are instructed to place one of these test-taker associated data code bearing labels on each exam and are cautioned not to allow anyone else to use their labels.

The well known bar code symbology used in this embodiment is commonly referred to as Code 3 of 9 ("Code 39"). Code 39 offers a full alphanumeric character set, the ability to print bar codes in a variety of sizes and densities, and bi-directional scanning. Code 39 bar code material may be obtained from commercial vendors and/or printers of bar code or printed using a suitable computer, a printer and an appropriate computer software package.

In a preferred embodiment, the computer is "The Macintosh II" and the laser printer is the "LaserWriter II NTX"; both are manufactured by Apple Computer, Inc. of Cupertino, Calif. The software used to print the bar codes is "Bar Code Labeler", manufactured by Videx, Inc. of Corvallis, Ore. and "PrintBar—Bar Code Fonts for the Apple Macintosh", manufactured by Bear Rock Software Company of Placerville, Calif.

After the examination, all testing materials are returned to ETS where they are placed in folders in preparation for the essay reading session. To minimize any possible bias, essays are scrambled at check-in to assure a folder is not made up of only one school's tests. Aides use an electronic scale to count essays and place an accurate fixed quantity in each folder.

Figure 2:
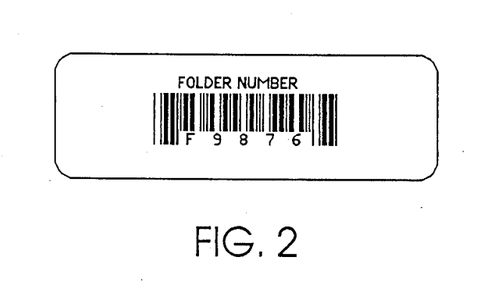
FIG. 2 is an illustration of a folder number adhesive label of the present invention.
Figure 4:
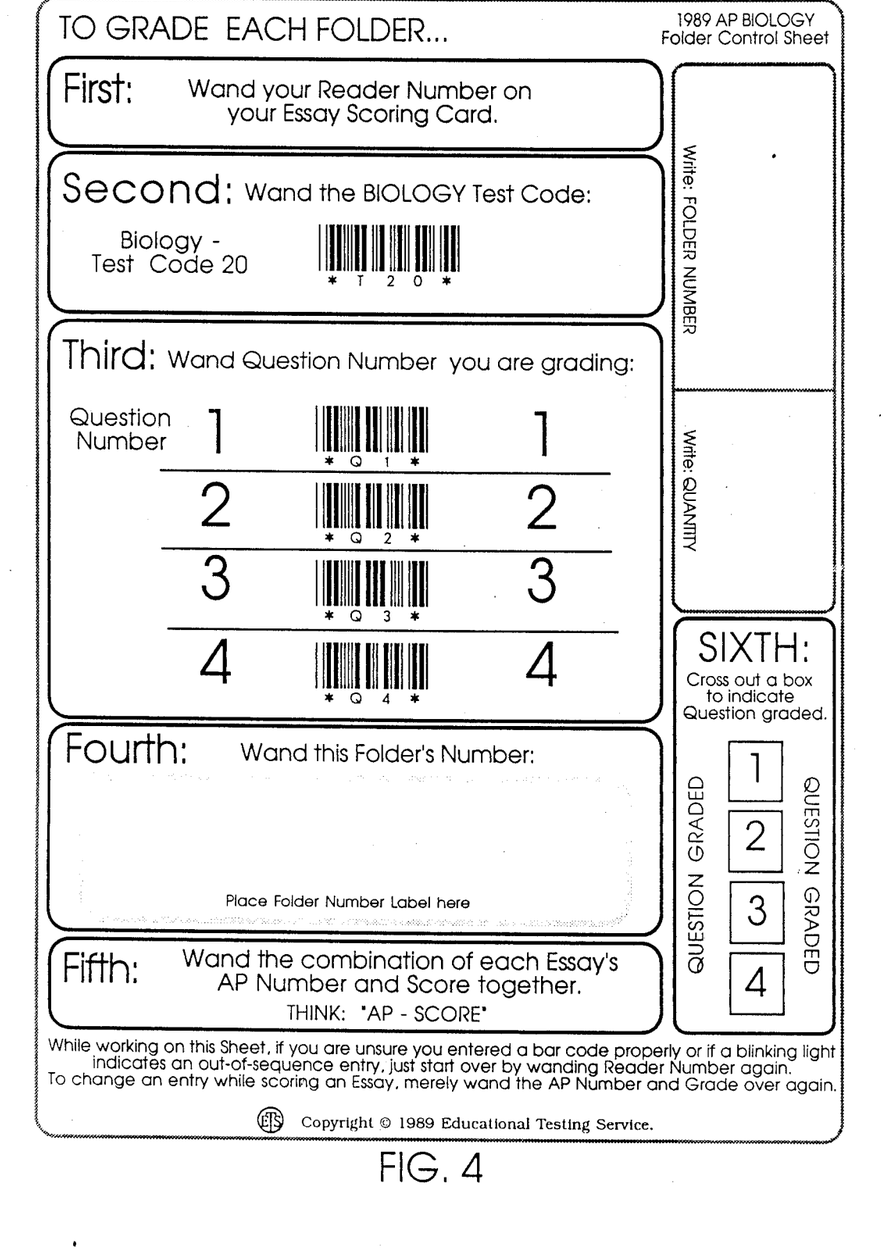
FIG. 4 is an illustration of an folder control sheet of the present invention.

Essays are reviewed to determine that they all have had an examinee number label (FIG. 1) affixed. If the label is missing, the test-taker's registration information is used to recreate the information and a label is created and affixed. Each folder is identified by a folder number which is assigned using consecutively numbered bar coded labels. The folder number label (FIG. 2) bearing a machine-readable data code associated with the folder is then placed on the folder control sheet (FIG. 4) which is then affixed to the folder. The folder number may also be written on each folder's flap so it can be read when the folders are placed in files. Aides place fully prepared folders in folder number order into file boxes and clearly label each box with the range of folder numbers it contains, so that folders can be refiled later in the same boxes.

Figure 3:
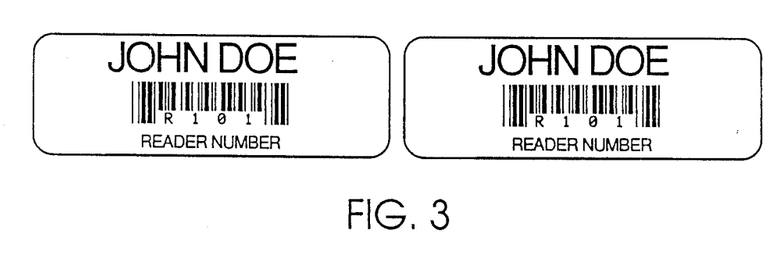
FIG. 3 is an illustration of a reader number adhesive label of the present invention.
Figure 5:
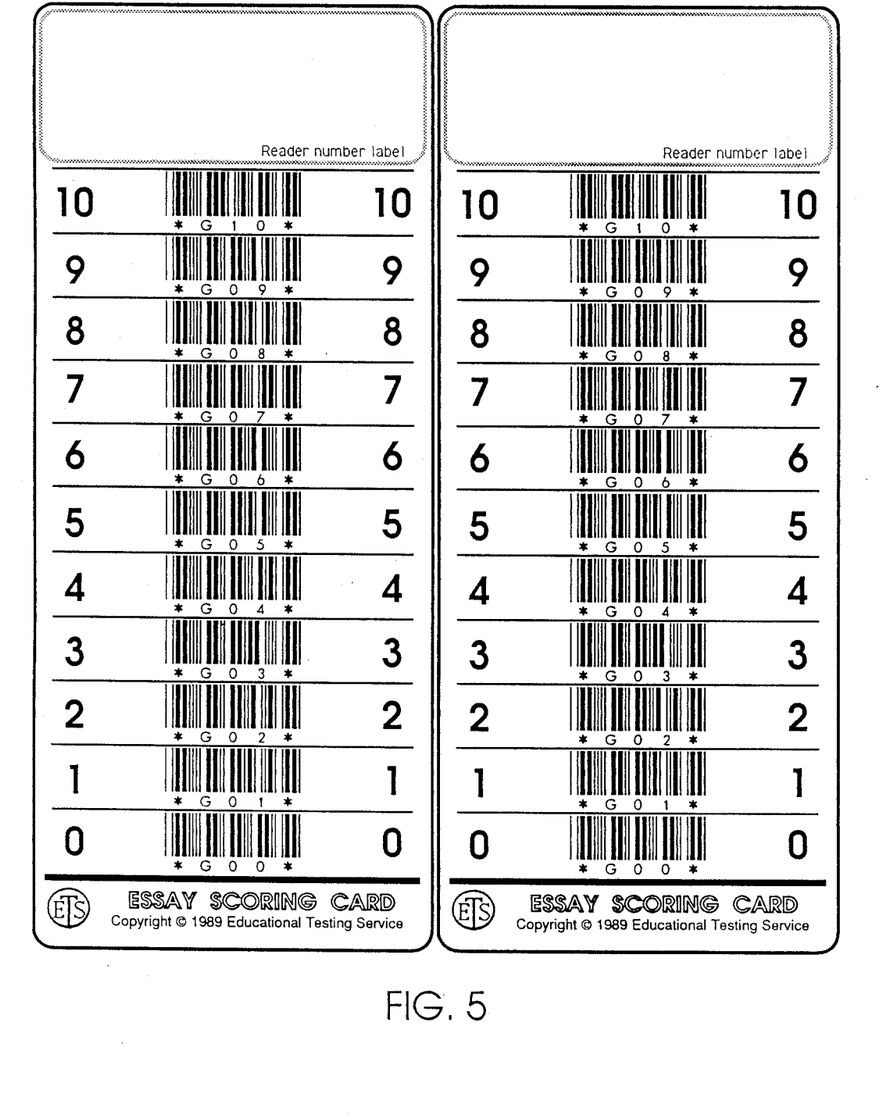
FIG. 5 is an illustration of an essay scoring card of the present invention, which has two identical sides, both are shown.

Readers' names and their reader numbers are entered into an on-site database and used to print a pair of reader number labels (FIG. 3) bearing machine-readable data code associated with the reader that are affixed to both sides of a reader's essay scoring card (FIG. 5). Two labels are preferably used so there is a backup if one is defective or if it wears excessively from contact with the sensing device. The reader database contains data on the table leader and table number to which the reader is assigned plus the question to be read.

To perform the grading task, each reader is presented with a portable self-powered programmed bar code sensing device to be used as data entry device and an essay scoring card bearing machine-readable data code associated with the grade as illustrated by the printed bar codes appearing on FIG. 5. The sensing devices are individually programmed with software specified to silently acknowledge a successful bar code scan by turning on a red light-emitting-diode with each successful scan.

One suitable device is a portable programmable optical code reader called the "Timewand", manufactured by Videx, Inc. of Corvallis, Ore. Normally, bar code sensors acknowledge scans via loud beepers, something that would be extremely disruptive to the reading/grading process. Therefore, in the preferred embodiment, the portable sensing device is beneficially programmed to silently acknowledge a successful bar code scan by turning on a red light-emitting-diode with each successful scan.

Each sensing device is configured and programmed by placing each one in a download slot cabled to the serial port of a personal computer on which the sensing device's configuration software is operational. Each sensing device is identified by a unique serial number which must match against a table of sensing device numbers in the personal computer before further interaction with the sensing device is permitted to take place. This is true both during configuring and in subsequent data downloading.

In the reading site computer room is a bank of recharging-downloading devices used to charge the batteries of the sensing devices before the reading begins. In a preferred embodiment of the present invention, the "Multiple Recharger/Downloader", manufactured by Videx, Inc. of Corvallis, Ore. has been used. Even though the predicted life of the charge is 3-5 days in this kind of use, as a precaution, the sensing devices are also placed in the rechargers overnight during the reading to maintain a full charge.

Figure 8:
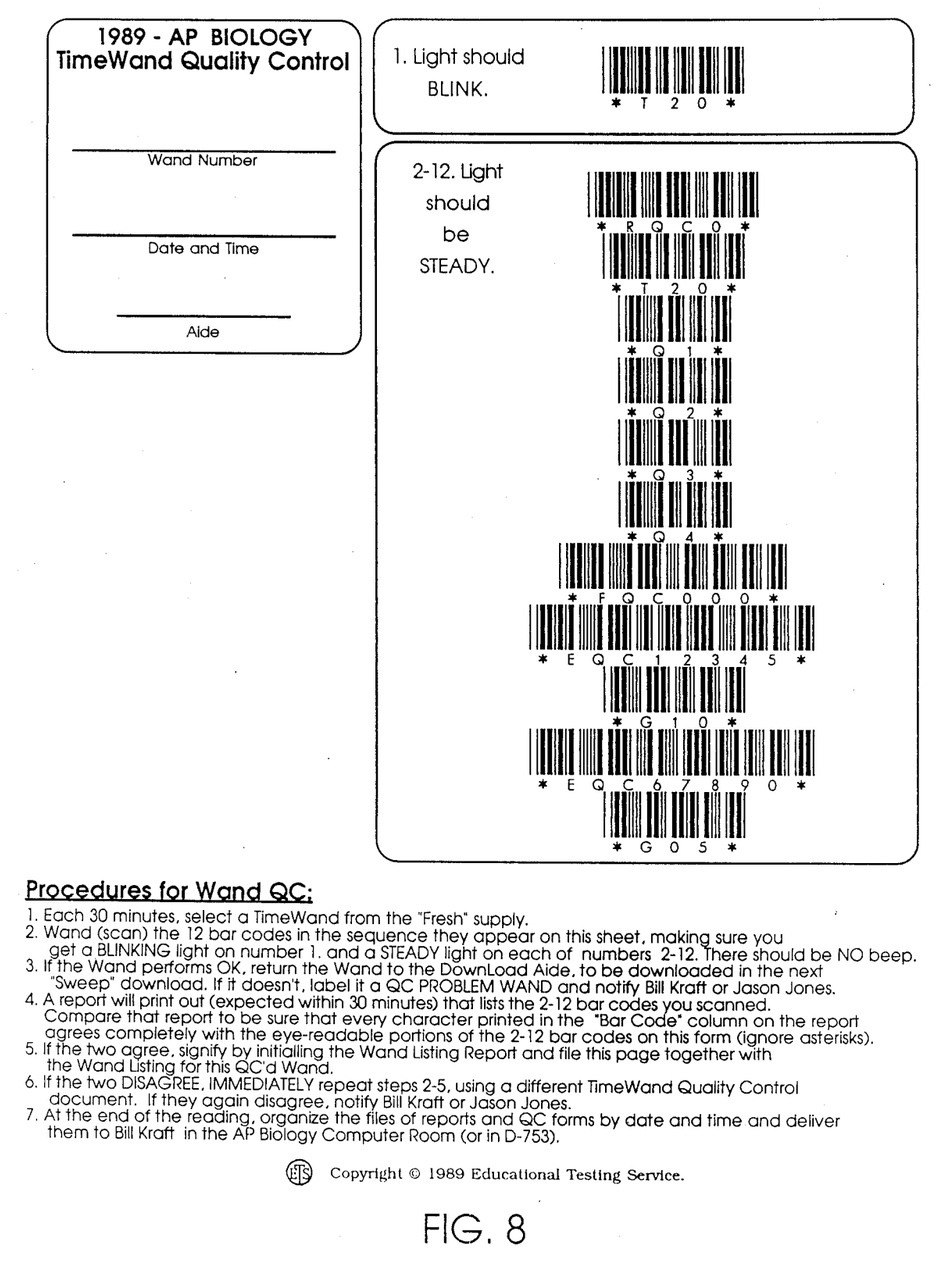
FIG. 8 is an illustration of a particular sensing device quality control sheet.

To assure the sensing devices are properly programmed and charged before they are given to readers, an aide tests each sensing device by scanning a bar code specifically designed for this test (representing an entry one level down in the sensing device's data hierarchy structure). An illustrative example of such a bar code is bar code number on sensing device quality control sheet (FIG. 8). To pass this test, the sensing device's acknowledgment light is programmed to "blink" (though this is normally the indication of an out-of sequence scan).

In a preferred embodiment, as an additional quality control measure, periodically the re-configured and re-programmed sensing devices are sampled, and the chosen device is required to scan and give proper responses to the twelve quality control bar codes appearing on FIG. 8. The chosen device is downloaded to the downloading computer which directs the printing of a report listing the data it purportedly scanned. The report listing is then compared to the quality control bar codes on the sensing device quality control sheet (FIG. 8). If the sample does not pass this test other actions are indicated.

As a part of their introduction to the use of the sensing device, readers are provided sample bar codes to use in practicing with the sensing devices on the first day. These materials use bar codes easily identified in subsequent downloading, thereby eliminating them from routine processing.

To minimize any uncertainty as to the accuracy of the scanning process using their essay scoring cards (FIG. 5), readers are trained to place the tip of the sensing device on the essay scoring card's numeric digit located before and after the bar code for a particular grade, then sweep in a straight line through the bar code. Training also enforces the importance of the regimen of scanning the score immediately after scanning the examinee number so there is no delay between the two entries, therefore no opportunity to forget whether the examinee number had been scanned. The readers are instructed to think "Exam-Score" and to always do the two together. Readers are instructed to leave incomplete folders open on the table any time they leave the room, including overnight. Also reinforced is the discipline to work from right to left, with completed essays moved to the reader's-folder's left.

The reading site is staffed with a number of aides with responsibilities to keep the flow of essays moving efficiently through the reading process. As they pick up scored folders from each room, aides verify that the proper question graded box on the folder control sheet (FIG. 4) has been crossed out by the readers. This check mark is the only visual indication of the progress of a folder, though any folder's status is also available in the central database. When a folder has all questions checked off, it is re-filed in proper sequence in its original box in final files.

To begin the actual reading process, each reader will initialize his/her sensing device by scanning his/her reader number off the reader number label (FIG. 3) and the machine-readable data codes associated with the test and the test question on the folder control sheet (FIG. 4), thereby personalizing the sensing device and associating it with the specific grading task ahead.

Next, the first essay is read and a grade determined. Then the examinee's identification number from the examinee number label (FIG. 1) on the cover of the essay book is scanned, followed immediately by a scan of the bar code representing the selected grade from the reader's essay scoring card.

At this point, all the data necessary for this essay question has been recorded in the sensing device (including, as provided by the sensing device, the date and time each bar code was scanned). The next testbook can now be processed in the same manner; first the examinee number, then the grade. These two steps are repeated until the entire folder of essays has been read and another folder can be graded in the same manner, starting again with reader number.

Quality control sheets (FIG. 6) are placed in the middle of the reader's tables. To get the reading started, readers scan and write the grades for the first few (3 or so) essays in each folder on the quality control sheet. The readers then pass the quality control sheets and the folder to the table leader, who also writes his/her grades for selected essays on the quality control sheets. Whether they agree or disagree, the essays remain in their original folders for subsequent processing. All quality control sheets are retained by the table leader to be collected later by a "quality control aide".

Figure 6:
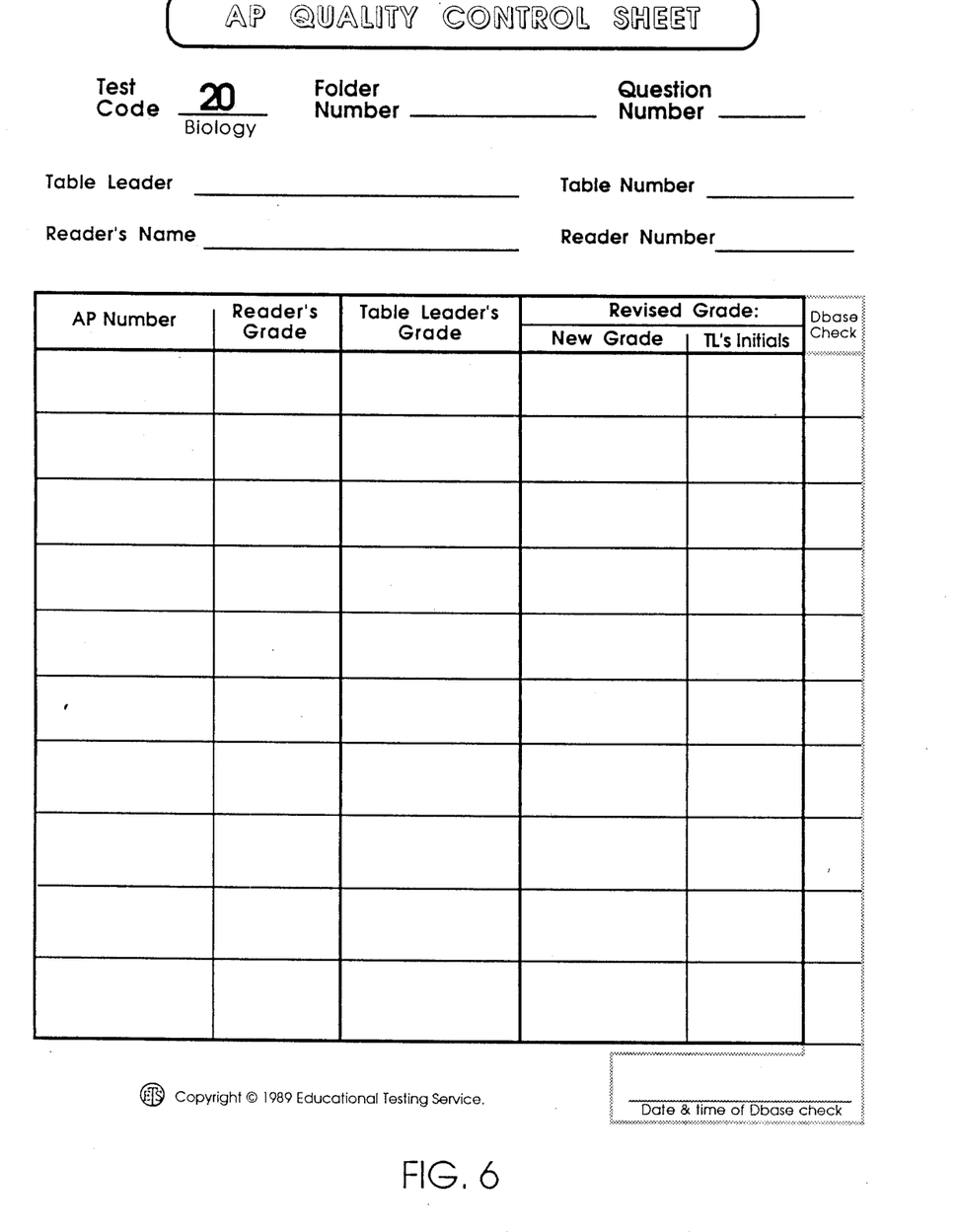
FIG. 6 is an illustration of a quality control sheet of the present invention.

If there is disagreement between a reader's grade and the table leader's grade, and if discussion results in a change in the reader's grade, the table leader notes that fact on the relevant quality control sheet (FIG. 6). Then the table leader uses his/her sensing device to enter the folder's cover sheet data (FIG. 4) and examinee number and the table leader's grade for that essay. Entry by the table leader serves as official notice of an override of the grade the reader originally entered via the his/her sensing device. At a later point in time, the data base record should be checked for entry of the revised grade, the results are recorded on the "Dbase Check" column on the quality control sheet (FIG. 6). In this manner an extra measure of control and increasing accuracy are provided.

Capturing bar-coded examinee identification, test identification, reader identification, essay score, etc., electronically, means that there is no longer a need for key entry of these data. As each reader scans the bar codes that represent the particular information the data is recorded directly into the sensing device's memory. Thus, the present invention eliminates the key entry process and all the concomitant error, grading sheet control and document transportation issues relating to the reading function of the examination. Moreover, because the source documents never have to leave the reading site for keying and the scoring data is available electronically, more current information critical to the management of the reading can also be made available as needed and in real time, while the readers and the tests are both at the test site.

Periodically throughout the day, the readers' "used" sensing devices are exchanged for "fresh" sensing devices in a cyclical "sensing-device-sweep" process, so named because it best describes the activity of exchanging all sensing devices at a table at the same time. The sensing-device-sweep comprises the following process for downloading the "used" sensing devices' data into a downloading computer for analysis and replacing them with "fresh" sensing devices.

The table's "used" sensing devices are placed in a yellow "used" sensing devices tray, and "fresh" sensing devices are distributed to the table from a red "fresh" sensing devices tray. The used sensing devices are delivered to the computer room, where the recharging-downloading devices are kept, and are inserted into the recharger-downloader for the downloading process. The recharger-downloader device communicates with the downloading computer through its serial port.

The downloading computer validates the sensing device's identification number against a table of proper sensing devices stored in the downloading computer. If the check results in a match, the sensing device is downloaded into the downloading computer. After the data is downloaded the data is cleared from the sensing device's storage means, and the sensing device is reprogrammed by the downloading computer as a "fresh"

sensing device. Quality control tests should be performed on the "fresh" sensing devices to ensure that the reprogramming has been successful and that the device is functioning properly. "Fresh" sensing devices are placed in a red fresh sensing devices tray for distribution to the tables during a subsequent sensing-device-sweep. The data downloaded from the sensing device may then be communicated to a central/file server computer for analysis over any suitable communications network. The central/file server computer analyzes the data for accuracy and validity. Exceptions found in the data are sent to a temporary file location, while acceptable data are loaded to the central scores database, both the temporary file location and the central scores database are resident on the central/file server computer.

The errors associated with the data in the temporary file location may be resolved via a manual or a computerized review process. One simplified review process is to merely delete suspect data for a test question, deletion will, in turn, necessitate a manual review of the relevant test materials to determine the missing data.

Essay data which have passed the accuracy and validity requirements are processed for each grading table and a table leader sweep report is generated. The report is printed on a printer connected to the central/file server computer. This report provides a summary of each table's score data contained in that sweep's sensing devices; it is scheduled to be delivered to the table leader within an hour of the sweep. In one embodiment, periodically, the central scores database may be uploaded via a modem to a mainframe computer for final data analysis and to provide a test-taker report.

In a preferred embodiment of the invention, the following arrangement of commercially available computer hardware and software has been found suitable. Three "Compaq Portable III" personal computers, manufactured by Compaq Computer Corporation of Houston, Tex., are used on site. One personal computer is used as the downloading computer, one as the central/file server computer and one as a network server (and backup). The three personal computers communicate with each other over a Novell local area network, manufactured by Novell Inc. of Provo, Utah. Connected to the central/file server computer is an "Epson LQ-FX850" dot matrix printer, distributed by Epson America, Inc. of Torrance, Calif., and a 2400 baud modem. In this preferred embodiment the central/file server computer runs a data base management system, "dBASE III PLUS" or "dBASE IV", both manufactured by Ashton-Tate Corporation of Torrance, Calif.

In order to provide the table leader with sufficient information to run his/her table according to the present invention, the table sweep report should comprise: the reader's name and number; the percentage of scores the reader awarded at each possible score point (that is, the percentage of 5's, the percentage of 8's, etc); the total number of essays graded by the readers at the table in the current "sweep" (that is, the number of questions the table has graded since the last time all the sensing devices were gathered); the mean scores awarded by each reader at the table for the last sweep and for all prior sweeps; a suitable scoring confidence interval for each reader at the table; the mean score awarded by all the readers at the table; and an identifying mark and the number of questions graded by any reader if the mean score awarded by the reader falls outside the particular reader's confidence interval.

The concept of a confidence interval is to give the table leader a quantitative measure on which to base a need for further review of reader's work. There are many different methods for determining a suitable confidence interval. For example, the confidence interval could represent a range of scores within which the sample mean would be expected to fall some pre-specified percentage, again, for example, ninety-five percent of the time, assuming a repeated random sampling and based on the well known statistical analysis of random sampling.

The present invention thereby permits a table leader to have a very complete picture of the performance of each of his/her readers throughout the reading. This information was not available using the prior art methods; except in those rare instances where there was an occasional clerically-intensive pencil and paper spreadsheet maintained at considerable expense in terms of time and effort. According to one embodiment of the present invention, a reader confidence interval is calculated based on all the readers' grading for a particular question. By comparison with the reader confidence interval a reader who demonstrates a tendency to consistently award scores that are higher or lower than his/her counterparts reading the same question may be identified. A summary of this information is very beneficial to the table leader who is able to respond expeditiously and appropriately to the situation much more quickly, and with the confidence based on a full array of score data.

Since the essay scores are periodically downloaded to the central data base computer throughout the reading and, as soon as the second set of grades for a folder is downloaded, the computer compares them with their earlier counterparts and identifies any essays that constitute discrepancies immediately. Each discrepant essay's folder-serial number is reported to clerks who have immediate access to these folders. They retrieve each discrepant essay, re-folder them and distribute them to the appropriate readers to be scored a third time. The computer also utilizes the readers' numbers to identify readers who "contributed" to the discrepancy, directing the third grading to different personnel. This process provides that all discrepancies can be identified before the reading ends, eliminating the need for subsequent make-up readings and their implicit additional costs and delays.

Figure 7:
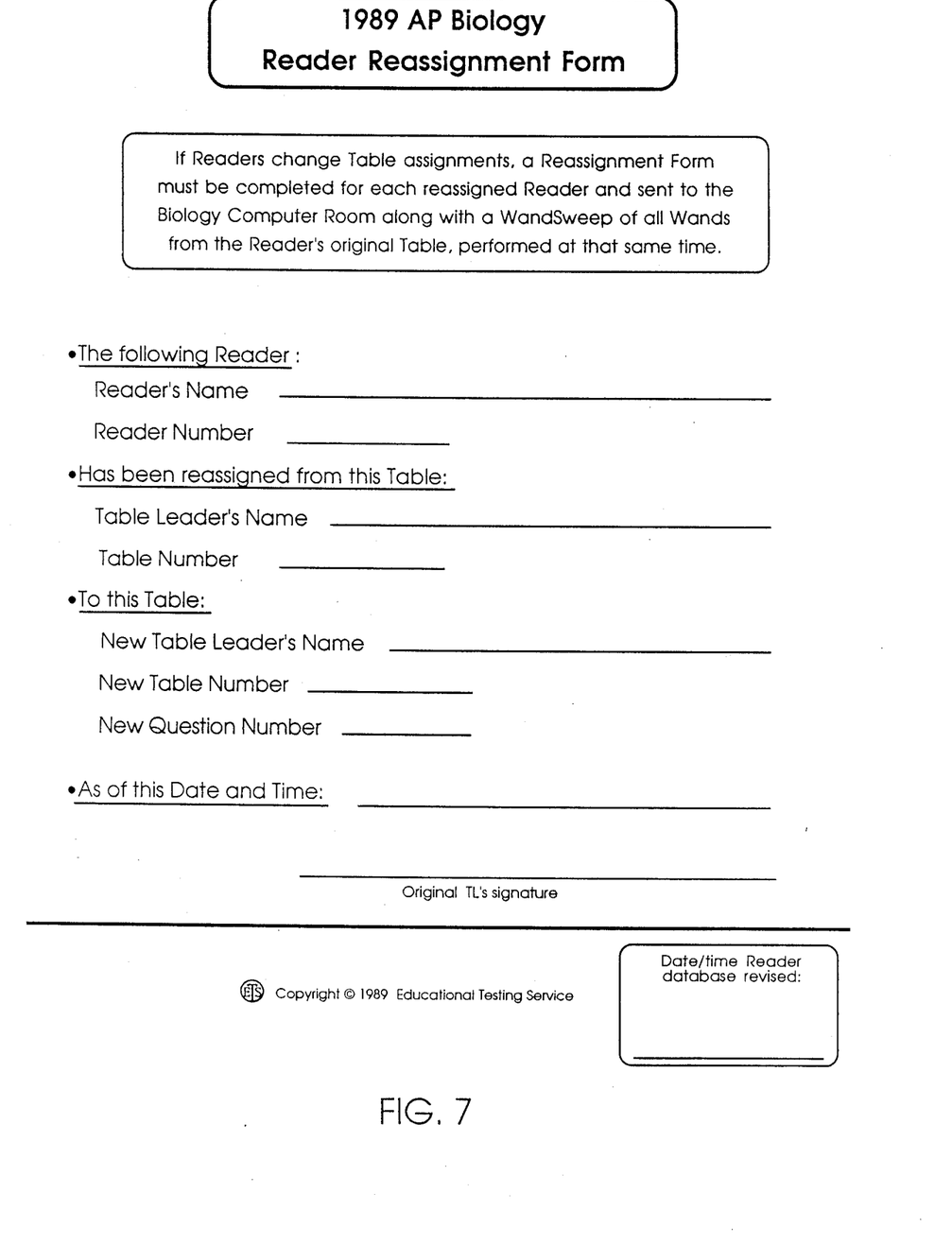
FIG. 7 is an illustration of a reader reassignment form of the present invention.

In order to assure that the reader database is current as to essay question number assignments, when a reader is reassigned to another table or question, a reader reassignment form (FIG. 7) should be completed. A data base entry is then made to identify this reader under the new assignment and table, thereby allowing a reader to move while also retaining the original reader characteristics under which the prior reading was performed.

Although preferred specific embodiments of the present invention have been described above in detail, it is desired to emphasize that this has been for the purpose of illustrating and describing the invention, and should not be considered as necessarily limitative of the invention, it being understood that many modifications can be made by those skilled in the art while still practicing the invention claimed herein.

I claim:

1. A method for processing free response test questions while maintaining the independence of grades and reducing paper handling comprising:

selectively associating with a test-taker machine-readable data code associated with the test-taker;
retrievably storing said association;
assembling test-taker materials which bear machine-readable data code associated with the test-taker;
selectively associating with a reader machine-readable data code associated with the reader;
retrievably storing said association;
assembling reader materials which bear the machine-readable data code associated with the reader;
selectively associating with a grade machine-readable data code associated with the grade;
assembling grade materials which bear the machine-readable data code associated with the grade;
selectively associating with a test machine-readable data codes associated with the test;
retrievably storing said association;
assembling test materials which bear the machine-readable data code associated with the test;
selectively associating with a test question machine-readable data code associated with the test question;
assembling test question materials which bear the machine-readable data associated with the test question;
assembling for all test-takers at a grading location test-taker materials, reader materials, grade materials, test materials and test question materials;
receiving selectively generated reader input for assigning a grade to said test materials;
selectively scanning, with a portable sensing device located at the grading location, the machine-readable data codes associated with the test-taker, the reader, the grade for the test question, the test, and the test question, for each question graded by a reader;
wherein the data code associated with the grade is scanned as the grade is assigned;
retrievably storing the data codes scanned by the sensing device and an indication of the time of the scanning; and
processing the stored data codes and the stored data code associations on a computer.

2. The method of claim 1 wherein the assembling of the test-taker materials further comprises distributing machine-readable data code labels associated with the test-taker to the test-taker and affixing the labels to the test materials.

3. The method of claim 2 wherein the labels are distributed to the test-taker during a registration for the test.

4. The method of claim 2 wherein the labels are distributed to the test-taker at a testing location.

5. The method of claim 1 wherein the portable sensing device is provided with data code storage and time of scan determining means.

6. The method of claim 5 wherein the portable sensing device retrievably stores the data codes scanned by the sensing device and the time of the scanning;

7. The method of claim 6 wherein periodically a sensing-device-sweep is performed for a table of readers.

8. The method of claim 7 wherein periodically a table of readers is provided with a table sweep report.

9. The method of claim 8 wherein the table sweep report comprises identifying the table and selectively associating readers and time interval, between successive entry of grades for test questions, with grades and test questions for a specified period of time.

10. The method of claim 9 wherein the table sweep report further comprises: readers' names and numbers; a percentage of scores each reader awarded at each possible grade; a total number of test questions graded by readers at a table in a current sweep; the mean scores awarded by each reader at the table for the last sensing-device-sweep and for all prior sweeps; a scoring confidence interval for each reader at the table; a mean score awarded by all the readers at the table; and an identifying mark and number of questions graded by a reader if the mean score awarded by the reader falls outside the readers' confidence interval.

11. A system for processing free response test questions while maintaining the independence of grades and reducing paper handling comprising:
printing indicia of and retrievably storing data code identifying each test-taker; distributing the indicia to each test-taker and affixing the indicia to test-taker materials used by the test-taker;
printing indicia of and retrievably storing data code identifying each reader and distributing the indicia to each reader;
printing indicia of each grade which can be awarded for a test question response and distributing the indicia to each reader;
printing indicia of and retrievably storing data code identifying each test which is to be graded and distributing the indicia to each reader;
printing indicia of each test question which is to be graded and distributing the indicia to each reader;
printing indicia of and retrievably storing data code identifying each folder which is to be graded and distributing the indicia to each reader;
distributing portable data code sensing devices and test-taker materials to the reader;
selectively scanning with the portable sensing device the data code indicia associated with the test-taker, the reader, the grade, the test, and the test question, for each question graded by a reader; wherein the data code indicia associated with the grade is scanned as the grade is assigned;
means for retrievably storing the data codes scanned by the sensing device; and
means for processing the stored data codes and the stored identifying data codes so as to provide a score for each test question associated with a test-taker.

12. The system of claim 11 wherein the sensing device is programmed to silently acknowledge a successful data code scan.

13. The system of claim 12 wherein processing of the data codes scanned by the sensing device further comprises means for periodically providing a table of readers with a table sweep report.

14. The system of claim 13 wherein the table sweep report comprises: identification of the table and an indication of a mean time for readers at a table to grade a test question; readers' names and numbers; a percentage of scores each reader awarded at each possible grade; a total number of test questions graded by readers at a table in a current sweep; the mean scores awarded by each reader at the table for the last sensing-device-sweep and for all prior sweeps; a scoring confidence interval for each reader at the table; a mean score awarded by all the readers at the table; and an identifying mark and number of questions graded by a reader if the mean score awarded by the reader falls outside the readers' confidence interval.

15. A method for scoring and grading a plurality of test materials containing a plurality of free response test questions wherein the responses to the questions are independently assigned a grade by a plurality of readers within predetermined grade scales depending on the response comprising:

providing a plurality of test-taker material units, each unit being provided with a distinct machine-readable data code indicia means associated with and identifying a test-taker;

providing a plurality of reader material units each unit being provided with a distinct machine-readable data code indicia means associated with and identifying a reader;

providing a plurality of grading material units each unit being provided with a distinct machine-readable data code indicia means associated with and identifying each assignable grade within the predetermined grade scale;

providing a plurality of test material units each unit being provided with a distinct machine-readable data code indicia means associated with and identifying a test;

providing a plurality of test question material units each unit being provided with a distinct machine-readable data code indicia means associated with and identifying a test question;

associating and retrievably storing data codes identifying test-takers with data code indicia identifying the test-takers on a first computer database;

receiving selectively generated reader input for assigning, for each test-taker test question response, a specific grade to be associated with the test-taker, reader, test and test question;

selectively scanning with a portable data code indicia sensing device means, for each test-taker test question response, the data code indicia for the specific grade, test-taker, reader, test and test question;

retrievably storing said selectively scanned data codes on a second computer database; and processing the stored first and second databases on a computer to provide a score for each test question associated with a test-taker;

wherein processing of the stored second database comprises periodically providing a table of readers with a table sweep report;

wherein the table sweep report comprises identification of the table and an identification of the time for readers at a table to grade a test question.

16. The method of claim 15 wherein the table sweep report further comprises: readers' names and numbers; a percentage of scores each reader awarded at each possible grade; a total number of test questions graded by readers at a table in a current sweep; the mean scores awarded by each reader at the table for the last sensing-device-sweep and for all prior sweeps; a scoring confidence interval for each reader at the table; a mean score awarded by all the readers at the table; and an identifying mark and number of questions graded by a reader if the mean score awarded by the reader falls outside the readers' confidence interval.

17. A method for scoring and grading a plurality of test materials associated with a test and test-takers and containing a plurality of free response test questions wherein the responses to the questions are independently assigned a grade by a plurality of readers within predetermined grade scales depending on the response comprising:

associating each test-taker with a test-taker number, means for retrievably storing the association, storing the association, printing the examinee number in the form of a bar code on self-adhering labels, distributing the bar code labels to the test-takers and selectively affixing the labels to test-takers test materials;

associating with each reader a reader number, means for retrievably storing the association, storing the association, printing the reader number in the form of a bar code on self-adhering labels;

associating with each test a test number, means for retrievably storing the association, storing the association and selectively printing the test number in the form of a bar code on test-taker test materials and on folder control sheets;

associating with a test question a test question number, means for retrievably storing the association, storing the association and selectively printing the test question number in the form of a bar code on test-taker test materials and on the folder control sheets;

associating with a folder used to hold a selection of test-taker materials a folder number, means for retrievably storing the association, storing the association, selectively printing the folder number in the form of a bar code on self-adhering labels; affixing the folder number label on the folder control sheet and affixing the folder control sheet to the folder;

identifying each grade within the predetermined grade scale for each test question and printing each grade in the form of a bar code on an essay scoring card;

affixing reader number bar code labels to the essay scoring card;

selectively assembling at grading tables, test-taker test materials in folders with affixed folder control sheet, readers and essay scoring cards with affixed reader number labels;

selectively scanning with a portable sensing device means bar code labels associated with the test-taker, the reader, the grade for the test question, the test, and the test question, for each question graded by a reader;

retrievably storing bar codes scanned by the sensing device and the time of scanning; and processing the stored scanned bar codes and the stored bar code associations on a computer to generate a test-taker report.

18. The method of claim 17 wherein processing of stored scanned bar codes comprises periodically providing a table of readers with a table sweep report.

19. The method of claim 18 wherein the table sweep report comprises identification of a table and an indication of time for readers to grade a test question.

20. The method of claim 19 wherein the table sweep report further comprises: readers' names and numbers; a percentage of scores each reader awarded at each possible grade; a total number of test questions graded by readers at a table in a current sweep; the mean scores awarded by each reader at the table for the last sensing-device-sweep and for all prior sweeps; a scoring confidence interval for each reader at the table; a mean score awarded by all the readers at the table; and an identifying mark and number of questions graded by a reader if the mean score awarded by the reader falls outside the readers' confidence interval.

* * * * *